Patented Nov. 29, 1932

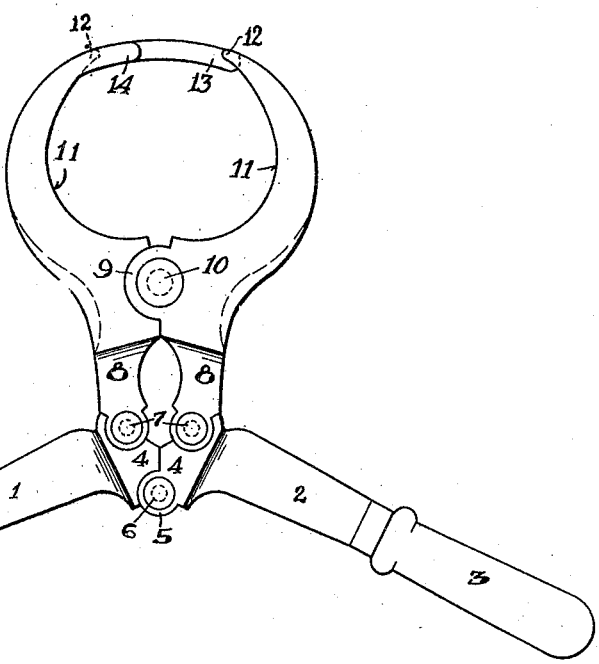
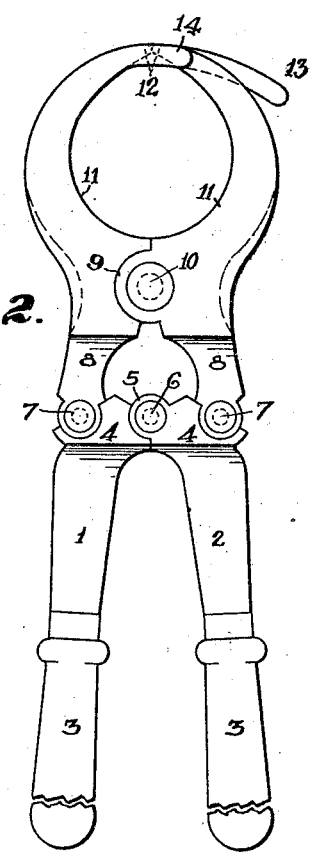
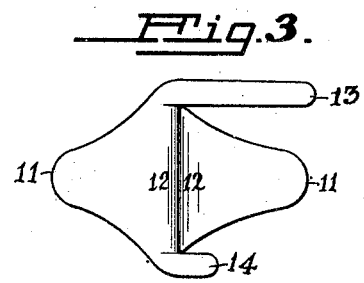
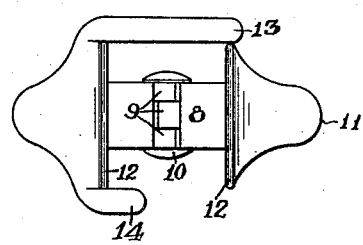

1,889,333

UNITED STATES PATENT OFFICE

PHILIP A. KLIPSTEIN, OF BAKERSFIELD, CALIFORNIA

CORD SEVERING IMPLEMENT

Application filed February 24, 1931. Serial No. 517,919.

This invention relates to improvements in implements of the kind adapted for use in severing the spermatic cord of animals.

An object of my invention is to provide an improved implement for severing the spermatic cord of animals.

Another object of my invention is to provide a device for securely maintaining the spermatic cord of an animal within the jaws of the device while they are actuated toward each other to sever the cord.

A further object of my invention is to provide an improved implement having a pair of novelly formed jaws which may be actuated toward each other in such a manner that an object positioned between them may be securely held while the jaws are moved against the object.

Other objects more or less apparent will present themselves or will be specifically pointed out in the description to follow:

In the accompanying drawing:

Fig. 1 is a side view of a cord severing implement constructed in accordance with my invention showing the positions of the various parts of the implement when the jaws are in separated positions;

Fig. 2 is a similar view showing the jaws in engaged or contacting positions;

Fig. 3 is a top plan view of the jaws when in the positions shown in Fig. 2; and Fig. 4 is a top plan view of the jaws when in the position shown in Fig. 1.

Referring to the drawing, the numerals 1 and 2 represent cooperating lever members, each having a handle 3 at one end and an enlarged part 4 at its opposite end. The enlarged parts 4 are of greater thickness than the main body of the lever members, and each is provided with one or more inwardly disposed protuberances 5 which are pivotally attached together, as by a screw or pin 6. Pivotally attached as by a pin or screw 7, to each of the enlarged parts 4 at points opposite the pin 6, is a shank 8 which is provided at certain points between its ends with one or more inwardly disposed protuberances 9. The protuberances 9 of the shanks are pivotally joined together, as by a pin or screw 10 which extends through suitable holes provided in the said protuberances. The shanks are each curved outwardly and upwardly as shown at 11, and each is provided at its free end with an inwardly disposed jaw 12 which is of considerable width. One of the jaws 12 is provided with an elongated projecting part 13 at one of its side edges and also with a shorter projecting part 14 at its opposite side edge. The elongated projecting part 13 is of sufficient length to extend slightly beyond the inwardly disposed edge of the jaw to which it is not attached, when the jaws are separated for the full distance permitted. The shorter projecting part 14 being of less length, does not extend to the inwardly disposed edge of the jaw to which it is not attached, when the jaws are separated for the full distance permitted, thereby providing an intervening space for the insertion of an animal's spermatic cord to be severed. After the spermatic cord to be severed has been placed between the inwardly disposed edges of the jaws, the said jaws may be actuated toward each other against the said cord by forcing the handles 3 toward each other. After the handles have been actuated toward each other for a certain distance, the projecting parts 13 and 14 of one of the jaws overlap and closely contact the side edges of the other jaw, thereby preventing the extremely tough spermatic cord from slipping off the engaged edges of the jaws prior to its being severed.

It is apparent to those skilled in the art that my improved cord severing implement may embody other forms equally as satisfactory as one shown herein, so for this and other apparent reasons I desire my invention included broadly within the spirit of the appended claims.

Having described my invention what I claim is:

1. A funis severing implement comprising a pair of shanks having inwardly disposed jaws at ends thereof, a plurality of projections extending from the side edges of the jaw of one of the shanks, one of the said projections being adapted to extend beyond the jaw of the other shank when the two jaws are either in extremely separated or adjacent position, and means for actuating the shanks, whereby the jaws may be moved toward or away from each other.

2. A funis severing implement comprising a pair of shanks having inwardly disposed jaws at adjacent ends thereof, pivotal means joining the shanks together, a projection extending from one of the jaws, which said projection extends along side and beyond the other jaw when the jaws are either separated for the maximum distance permitted during the operation thereof or are in close proximity to one another, and means for actuating the shanks, whereby the jaws may be moved toward or away from each other.

3. A funis severing implement comprising a pair of shanks pivotally joined together, each having an inwardly disposed jaw at an end thereof, means for actuating the shanks whereby the jaws may be moved toward or away from each other, and a projection extending from the side edge of one of the jaws, which said projection extends beyond the inwardly disposed edge of the other jaw and in contact with the side edge thereof when the inwardly disposed edges of the jaws are in close proximity to each other or are separated for the maximum distance permitted.

4. A funis severing implement comprising a pair of shanks pivotally joined together, an inwardly disposed jaw on each shank, an elongated projection located at the side edge of one of the jaws, a shorter projection located at the opposite side edge of the same jaw, which said projections are adapted to be positioned adjacent the side edges of the other jaw when the inwardly disposed edges of the jaws are near each other, the longer of the two projections extending beyond the inwardly disposed edge of the other jaw in all operating positions of the jaws and means for actuating the shanks, whereby the jaws may be moved toward or away from each other.

In testimony whereof I have affixed my signature.

PHILIP A. KLIPSTEIN.